(12) United States Patent
Zhang et al.

(10) Patent No.: US 10,462,673 B2
(45) Date of Patent: Oct. 29, 2019

(54) WIRELESS NETWORK MANAGEMENT AND ONLINE SIGNUP OF SERVICES

(71) Applicant: Time Warner Cable Enterprises LLC, Saint Louis, MO (US)

(72) Inventors: Qiang Zhang, McLean, VA (US); Arun Manroa, Herndon, VA (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 0 days.

(21) Appl. No.: 16/121,626

(22) Filed: Sep. 5, 2018

(65) Prior Publication Data

US 2019/0021008 A1    Jan. 17, 2019

Related U.S. Application Data

(62) Division of application No. 14/886,441, filed on Oct. 19, 2015, now Pat. No. 10,091,658.

(51) Int. Cl.
*H04W 16/02* (2009.01)
*H04W 8/20* (2009.01)
*H04W 84/12* (2009.01)

(52) U.S. Cl.
CPC ............. *H04W 16/02* (2013.01); *H04W 8/20* (2013.01); *H04W 84/12* (2013.01)

(58) Field of Classification Search
CPC ........ H04W 8/20; H04W 16/02; H04W 84/12
USPC ........... 455/410, 411, 414.1, 435.1; 370/252, 370/401
See application file for complete search history.

(56) References Cited

U.S. PATENT DOCUMENTS

| | | |
|---|---|---|
| 2010/0120450 A1 | 5/2010 | Herz |
| 2010/0182915 A1 | 7/2010 | Montemurro et al. |
| 2013/0031192 A1 | 1/2013 | Caspi et al. |

*Primary Examiner* — Sam Bhattacharya
(74) *Attorney, Agent, or Firm* — Armis IP Law, LLC

(57) ABSTRACT

A wireless access point receives configuration information assigned to a particular service provider. The configuration information includes information indicating a wireless network identifier (such as a network name or SSID value) assigned to the service provider. The wireless network identifier is available for use by communication devices to establish a wireless connection with the wireless access point and perform multiple different functions. For example, the configuration information can include multiple resource links assigned to the particular service provider. Via use of the wireless network identifier, a communication device can establish a wireless communication link with the wireless access point. The communication device communicates a selected one of the multiple links to the wireless access point to indicate which of multiple functions (such as online sign-up or actual use of wireless network services) can is being requested.

31 Claims, 9 Drawing Sheets

WIRELESS NETWORK MANAGEMENT AND ONLINE SIGNUP OF SERVICES

RELATED APPLICATION

This application is a divisional application of U.S. patent application Ser. No. 14/886,441 entitled "WIRELESS NETWORK MANAGEMENT AND ONLINE SIGNUP OF SERVICES," filed on Oct. 19, 2015, the entire teachings of which are incorporated herein by this reference.

BACKGROUND

Conventional computer devices typically have the ability to identify a presence of WiFi™ access points. For example, according to current technology, to learn of one or more access points in a region, a computer device can monitor a respective wireless region for presence of so-called beacons or probe responses generated by wireless access points. The beacons or probe responses indicate identities (a.k.a., SSIDs) of any wireless access points within wireless range of the communication device.

In certain instances, a respective SSID is a human-readable network name assigned to a respective network. Accordingly, via the response information from the access points, the operator of the computer can identify which, if any, WiFi™ networks are available for use in the region.

According to conventional techniques, since each SSID (logical network name) corresponds to a different available network, the respective user or communication device is able to make a selection of a wireless network and then connect to any of multiple networks depending upon the chosen SSID (network name).

Conventional WiFi™ now supports so-called Passpoint services. In general, use of Passpoint services allow your mobile communication device to identify availability of different service providers associated with a particular wireless access point as the mobile device roams through a respective geographical region. If a user of a communication device subscribes to service provider associated with a wireless access point as indicated by passpoint information, the communication device is able to use the wireless access point to connect to the Internet.

BRIEF DESCRIPTION OF EMBODIMENTS

Use of conventional wireless networks suffer from a number of deficiencies. For example, via a Passpoint service notification, a service provider may wish to provide the ability for users to sign up and subscribe to services through the wireless access point as well as enable subscribers to use the wireless access point to access the Internet. In such an instance, according to conventional techniques, a respective service provider must be allocated use of two SSIDs to support such functions. For example, for a given wireless access point, the service provider needs to be assigned a first SSID associated with the wireless access point, enabling a respective user to establish a wireless communication link with the wireless access point and perform online sign-up of wireless services from the particular service provider. Additionally, according to conventional techniques, the service provider needs to be assigned a second SSID associated with the wireless access point, enabling the respective user to establish a wireless communication link with the wireless access point and use wireless services provided by the particular service provider to access the Internet.

In contrast to conventional techniques, a wireless access point according to embodiments herein receives configuration information assigned to a particular service provider. The configuration information includes information indicating a wireless network identifier (such as a network name or SSID value) assigned to the service provider for use of the wireless access point. The wireless network identifier is available for use by communication devices to establish a wireless connection with the wireless access point. Additionally, the configuration information includes multiple resource links assigned to the wireless network identifier. Each of the resource links associated with the wireless network identifier supports a different function supported by the service provider. For example, in one embodiment, a first selectable resource link supports on-line sign up of wireless network service provided by the particular service provider. A second selectable resource link supports use of the wireless network services provided by the service provider.

In one embodiment, the wireless access point receives a request from the communication device for the configuration information. In response to receiving the request, the wireless access point transmits a wireless notification to the communication device indicating: i) the wireless network identifier, and ii) the multiple corresponding resource links associated with the wireless network identifier.

In accordance with further embodiments, the multiple corresponding resource links associated with the wireless network identifier includes at least a first link and a second link. As previously discussed, the first selectable link (such as signup link) enables a respective user of the communication device to sign up for wireless network services provided by the particular service provider. The second selectable link (such as a passpoint information access link) enables a respective user of the communication device to use wireless network services provided by the particular service provider after the user has signed up (becomes a subscriber authorized) to use the particular service provider's wireless network services.

From the perspective of a client communication device, the communication device receives the wireless notification from the wireless access point. As previously discussed, the wireless notification indicates: i) a wireless network identifier in which to establish a wireless connection with the wireless access point, and ii) multiple corresponding selectable resource links associated with the wireless network identifier. The communication device selects a resource link from the multiple corresponding resource links. The communication device generates a request to establish a wireless communication link with the wireless access point using the wireless network identifier and a selected resource link. Via the request, the communication device communicates the selected resource link amongst the multiple corresponding resource links over the established wireless communication link to the wireless access point. If the communication device needs to sign up for wireless network services provided by the particular service provider, the communication device selects the first link to sign up for the wireless network services. Alternatively, if the communication device is already a subscriber of the particular service provider, the communication device selects the second link to use the wireless network services.

In this manner, instead of requiring different SSIDs to be used for sign up and actual use of wireless network services by a given service provider, embodiments herein include reuse of the same wireless network identifier (such as SSID) for these functions. In other words, embodiments herein are useful over conventional techniques. For example, as previously discussed, conventional techniques require that the service provider be assigned two distinct SSIDs—one supporting on-line sign-up of wireless network subscription services and another supporting actual use of the wireless network subscription services to existing subscribers. In contrast to conventional techniques, embodiments herein including consolidating SSIDs amongst service providers, while still providing each of multiple different service providers an ability to control wireless network access.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment as described herein includes a computer readable storage hardware having instructions stored thereon. The instructions, when executed by computer processor hardware, cause the computer processor hardware of the system to: receive configuration information assigned to a particular service provider, the configuration information including: i) a wireless network identifier in which to establish a wireless connection with the wireless access point, and ii) multiple resource links assigned to the particular service provider for use over a wireless link established using the wireless network identifier; and from the wireless access point, transmit a wireless notification to a communication device, the wireless notification indicating: i) the wireless network identifier, and ii) the multiple corresponding resource links.

Another embodiment as described herein includes computer readable storage hardware having instructions stored thereon. The instructions, when executed by computer processor hardware, cause the computer processor hardware of the system to: transmit a first notification indicating a wireless network identifier assigned to a particular service provider associated with the wireless access point; transmit a second notification, the second notification: i) indicating identities of service providers providing access through the wireless access point, and ii) notifying the communication device to use the wireless network identifier assigned to the wireless access point and one of multiple selectable authentication options to sign up for use of a service provided by one of the service providers.

Another embodiment as described herein includes computer readable storage hardware having instructions stored thereon. The instructions, when executed by computer processor hardware, cause the computer processor hardware of the system to: receive wireless notification from a wireless access point in a wireless network environment, the wireless notification indicating: i) a wireless network identifier in which to establish a wireless connection with the wireless access point, and ii) multiple corresponding resource links associated with the wireless network identifier; select a resource link from the multiple corresponding resource links; initiate association and establishment of a wireless communication link with the wireless access point using the wireless network identifier; and communicate the selected resource link amongst the multiple corresponding resource links to the wireless access point.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for implementing on-line sign up and usage of wireless network services by each of one or more service providers. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
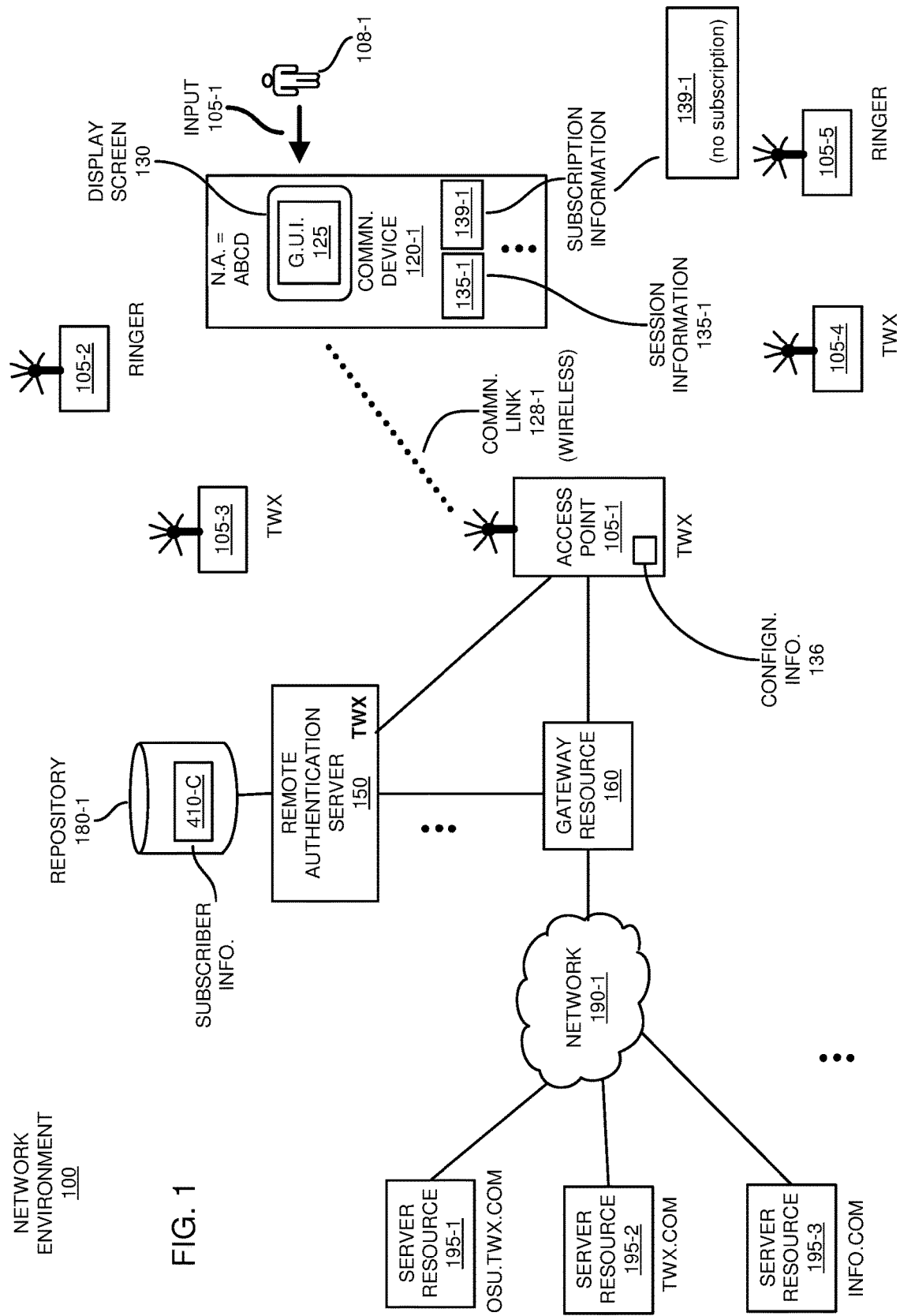
FIG. 1 is an example diagram illustrating a network environment supporting online sign up and usage of wireless network services according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In accordance with one embodiment, a wireless access point receives configuration information assigned to a particular service provider. The configuration information includes information indicating a wireless network identifier (such as a network name or SSID value) assigned to the particular service provider and corresponding wireless access point. The wireless network identifier is available for use by communication devices to establish a wireless connection with the wireless access point and perform multiple different functions.

In one embodiment, the configuration information assigned to the particular service provider includes multiple corresponding selectable options (such as resource links), each of which supports a different function associated with the particular service provider. The wireless access point distributes the configuration information assigned to the service provider to a user-operated communication device.

Via use of the wireless network identifier, the user-operated communication device is able to request to establish a wireless communication link with the wireless access point. The communication device communicates a selected one of the multiple options to the wireless access point to indicate which of multiple functions (such as online sign-up or actual use of wireless network services) is being requested.

In accordance with further embodiments as presented in greater detail below, depending on the selected option and corresponding wireless network identifier, the wireless access point initiates different types of authentication needed to perform the different types of requested services.

Now, more specifically, FIG. 1 is an example diagram illustrating a network environment according to embodiments herein.

As shown, network environment 100 includes resources such as remote authentication server 150, wireless access points 105 (including wireless access point 105-1, 105-2, 105-3, 105-4, 105-5, etc.), server resources 195-1, server resource 195-2, server resource 195-3, communication device 120-1, gateway resource 160, network 190-1, etc.

Note that each of the resources in FIG. 1 (and other FIGS.) represents and/or includes appropriate hardware, software, or a combination of hardware and software to carry out functionality as discussed herein. Further note that the term wireless access point as described herein refers to any of one or more wireless access resources (radio frequency interface, access point controller, etc.) managing wireless communications in network environment 100.

In general, network environment 100 includes resources that collectively provide wireless connectivity between mobile communication devices and a corresponding network such as the Internet. For pre-existing subscribers, each of the wireless access points 105 enables a respective communication device to establish a respective wireless connection. Subsequent to being authenticated by the remote authentication server 150, a combination of the respective wireless access point and corresponding gateway resource 160 provide the communication device access to any of one or more target resources in network 190-1 (such as the Internet).

As previously discussed, a downside of conventional wireless networks is the need to allocate multiple network names such as multiple different SSID values by each operating service provider for instances in which the service provider would like to provide multiple functions through the respective wireless access point. For example, at least one SSID must be allocated by the service provider to enable online sign-up of wireless network services from each of the hosted service providers and at least one SSID must be allocated by each of the service providers for use by the pre-existing authorized local or roaming subscribers to use the wireless network services. Thus, from the perspective of a user device, for such a given service provider, one SSID or given service provider is used to signup for services; another SSID of the given service provider is allocated to support use of the wireless services by current subscribers. Embodiments herein alleviate this requirement as further discussed below.

More specifically, in contrast to conventional techniques, in one example embodiment, each wireless access point in the network environment 100 is assigned one or more wireless network identifiers (such as one or more different SSID values) to support communications on behalf of one or more service providers. Assume in this example that the wireless access point 105-1 is at least partially made available and/or owned by the TWX Corporation and that wireless access point 105-1 provides corresponding pre-existing TWX subscribers access to network 190-1 through gateway resource 160. Users and corresponding communication devices in network environment 100 utilize the wireless network identifiers (such as SSID values) as a basis in which to perform association and establish a wireless communication link with a respective wireless access point.

As indicated by subscription information 139-1, assume in this example embodiment, the user 108-1 of communication device 120-1 is initially not a subscriber to the TWX services. In such an instance, the user 108-1 of communication device 120-1 is not able to use the TWX services, which includes wireless access point 105-2, wireless access point 105-5, etc.

Figure 2:
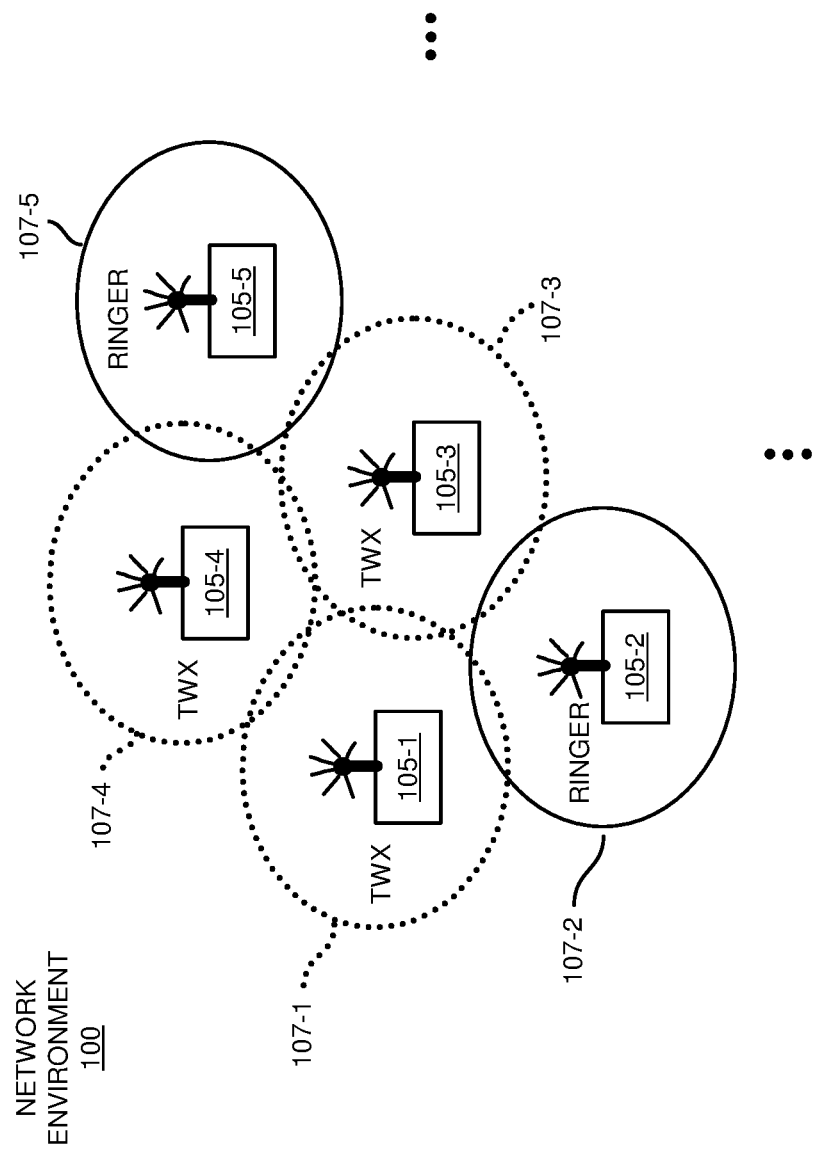
FIG. 2 is an example diagram illustrating multiple wireless access points and corresponding wireless coverage according to embodiments herein.

The following FIG. 2 illustrates how respective user 108-1 and corresponding communication device 120-1 have no wireless coverage or capability available when the subscriber is not a subscriber of TWX sponsored services as indicated by subscription information 139-1.

More specifically, FIG. 2 is an example diagram illustrating overlapping wireless coverage provided by multiple wireless access points in a network environment according to embodiments herein.

As shown, a first set of multiple wireless access points including wireless access point 105-1, wireless access point 105-3, wireless access point 105-4, etc., are associated with a first service provider (namely, TWX corp.). Assume that the first service provider (TWX) at least partially owns, operates, pays fees for use of, rents, etc., the first set of wireless access points to provide wireless connectivity to corresponding subscribers in network environment 100.

As further shown, a second set of multiple wireless access points including wireless access point 105-2, wireless access point 105-5, etc., are associated with second service provider (namely, RINGER corp.). The second service provider (RINGER) at least partially owns, operates, rents, etc., the second set of wireless access points to provide wireless connectivity to corresponding subscribers in network environment 100.

Each of the wireless access points 105 provides wireless coverage to one or more respective users within wireless range. For example, the wireless access point 105-1 provides wireless network connectivity to users in region of wireless coverage 107-1; wireless access point 105-3 provides wireless network connectivity to users in a region of wireless coverage 107-3; wireless access point 105-4 provides wireless network connectivity to users in a region of wireless coverage 107-4; and so on. The wireless access point 105-2 provides wireless network connectivity to users in region of wireless coverage 107-2; wireless access point 105-5 provides wireless network connectivity to users in region of wireless coverage 107-5; and so on.

Figure 4:
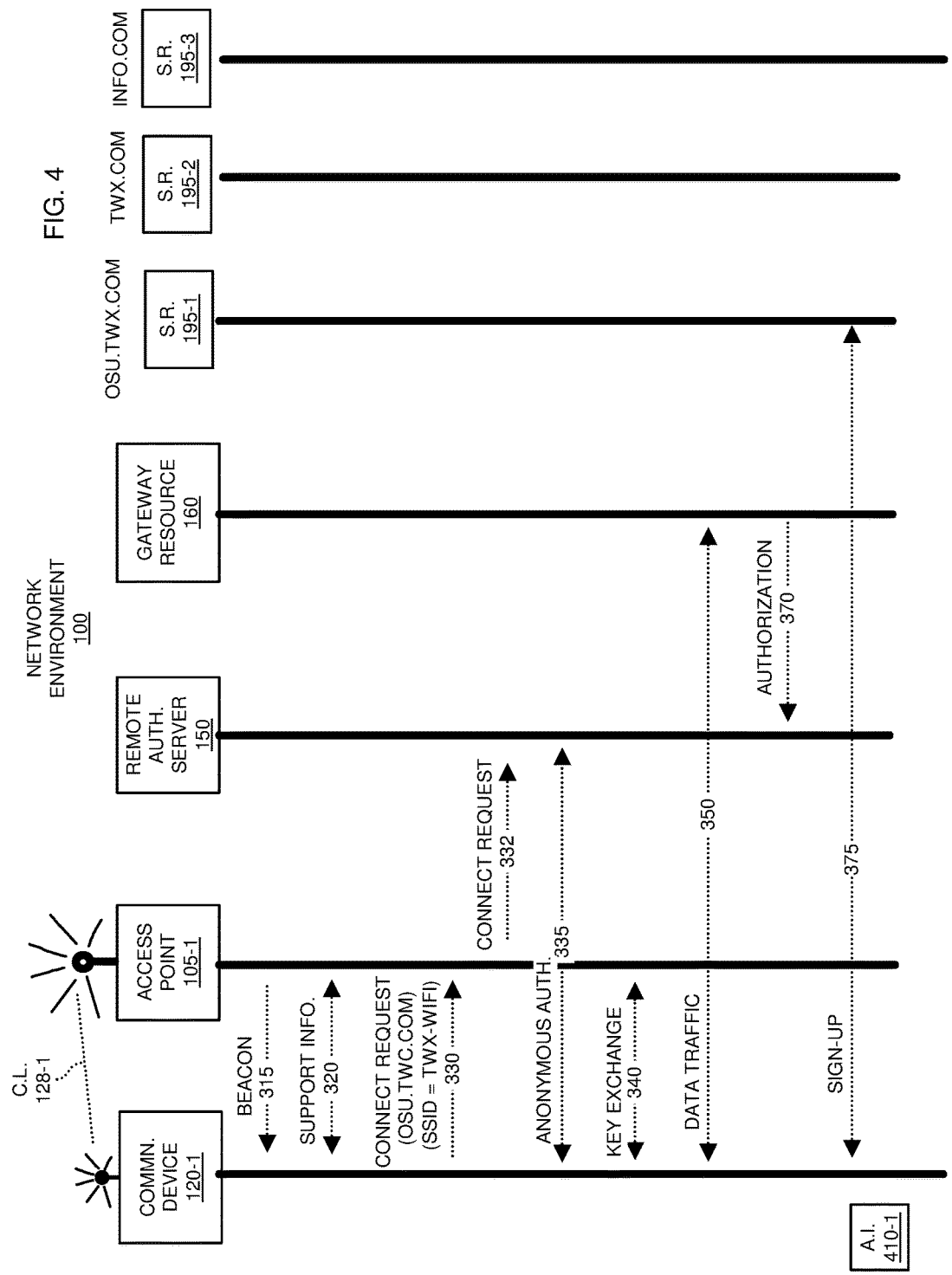
FIG. 4 is an example diagram illustrating use of a wireless network identifier and corresponding communications supporting online sign up of wireless network services according to embodiments herein.

FIG. 4 is an example diagram illustrating use of a wireless network identifier and corresponding authentication communications to support online sign up of wireless network services according to embodiments herein.

In this example embodiment, assume that the user 108-1 would like to expand his/her wireless network coverage such that the user 108-1 is able to operate the communication device 120-1 in more geographical regions such as including TWX wireless coverage regions supported by TWX. In such an instance, the user 108-1 initiates signing up for wireless network services provided by one or more additional service providers as further discussed below.

Recall that the user 108-1 and corresponding communication device 120-1 do not yet subscribe to TWC services. To obtain increased coverage, assume that the user 108-1 would like to sign up for use of TWX wireless network services.

Assume that the user 108-1 operates the communication device 120-1 while in a vicinity of the wireless access point 105-1. Via communications 315 such as one or more wireless messages, the wireless access point 105-1 transmits a respective beacon or probe response to the communication device 120-1.

In one embodiment, the communications 315 include information indicating presence and availability of the wireless access point 105-1 in the network environment 100. Further, the communications 315 include a notification indicating that the wireless access point 105-1 supports distribution of so-called passpoint information.

To learn of service providers associated with the wireless access point 105-1, and retrieve corresponding pass point information indicating the one or more service provider supported by the corresponding wireless access point 105-1, the communication device 120-1 transmits a query (such as a pass point information query) to the wireless access point 105-1. In response to receiving the query from the communication device 120-1 requesting service provider support information, the wireless access point 105-1 transmits all or a portion of the configuration information 136 in FIG. 3 to the communication device 120-1.

Transmission of the configuration information 136 to the communication device over a wireless communication link notifies the communication device 120-1 of the different service providers supported by the wireless access point 105-1 as well as corresponding information enabling the respective user 108-1 of the communication device 120-1 to execute different functions associated with a respective service provider such as: i) signing up to become a subscriber of corresponding wireless network services provided by the respective service provider, ii) using wireless network services provided by the respective service provider, etc.

Figure 3:
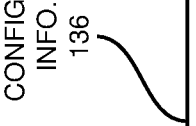
FIG. 3 is an example diagram illustrating configuration information and multiple selectable options supporting online sign up and usage of wireless network services according to embodiments herein.

As shown in FIG. 3, by way of non-limiting example embodiment, the configuration information 136 provided to the communication device 120-1 indicates that the wireless network identifier TWX-WIFI (such as an SSID) has been assigned to the service provider TWX. As further discussed below, via the first selectable option (resource link) OSU.TWX.COM associated with wireless network identifier TWX-WIFI, the corresponding user 108-1 can sign up for use of wireless network services provided by service provider TWX through the wireless access point 105-1. Subsequent to becoming a subscriber, via the second selectable option (resource link) TWX.COM associated with the wireless network identifier TWX-WIFI, the corresponding user 108-1 can use the wireless network services provided by service provider TWX through the wireless access point 105-1 to access network 190-1.

Thus, rather than associating each of the resource links (selectable options) with a corresponding different unique wireless network identifier or SSID, embodiments herein include associating multiple resource links (such as one resource link to sign up for services and another resource link to use wireless network services) to a same wireless network identifier (such as SSID). That is, both resource links OSU.TWX.COM and TWX.COM are assigned wireless network identifier TWX-WIFI; both resource links OSU.JAMMIN.COM and JAMMIN.COM are assigned wireless network identifier JAMMIN-WIFI; etc.

As further described herein, as further shown in FIG. 4, selection of the first option such as OSU.TWX.COM in a request to establish a wireless communication link using the wireless network identifier TWX-WIFI indicates that a user 108-1 of the communication device 120-1 is attempting to subscribe to the wireless network services via on-line sign up services. Selection of the second option such as TWX.COM in a request to establish a wireless communication link using the wireless network identifier TWX-WIFI indicates that a user 108-1 of the communication device 120-1 is requesting to use the available the wireless network services provided by service provider TWX.

Further in this example, as previously discussed, the user 108-1 initially is not a TWX subscriber. Assume, as previously discussed, that the user 108-1 desires to subscribe to the wireless network services provided by TWX. In such an instance, to sign up for wireless network services provided by service provider TWX, via communications 330, the communication device 120-1 uses the wireless network identifier TWX-WIFI to establish a corresponding wireless communication link 128-1 between the communication device 120-1 and the wireless access point 105-1.

During the association (connection request via communications 330), the communication device 120-1 forwards the selected option including resource link OSU.TWX.COM to the wireless access point 105-1 to notify the wireless access point 105-1 that the user 108-1 would like to sign up for services provided by service provider TWX.

Additionally, because the user 108-1 is not yet a subscriber, via communications 330 the communication device 120-1 conveys a value of ANONYMOUS (or other suitable value) along with the resource link OSU.TWX.COM to notify the wireless access point 105-1 that the user 108-1 is a new user and not yet a subscriber.

In response to receiving the connection request via communications 330, the wireless access point 105-1 forwards the connection request and corresponding received information (such as ANONYMOUS@OSU.TWX.COM) from the communication device 120-1 to the remote authentication server 150 via communications 332. Use of the unique network address OSU.TWX.COM differentiates the on-line sign up process requested by the user 108-1 from other requests for normal passpoint traffic sessions attempting to use the wireless network identifier to use wireless network services provided by the service provider TWX.

Thus, the conveyance of information such as the values ANONYMOUS and OSU.TWX.COM provide notification to the wireless access point 105-1 and remote authentication server 150 that the user 108-1 associated with communication device 120-1 has not yet been authorized to use wireless network services provided by the service provider TWX.

After the remote authentication server 150 discovers that communication device 120-1 and user 108-1 does not yet have a subscription to provided by the service provider TWX, the remote authentication server 150 furthers association of the communication device 120-1 to the wireless access point 105-1 using the wireless network identifier TWX-WIFI based on an anonymous authentication method such as an authentication based on anonymous EAP-TLS.

Via further communications 335, in accordance with further embodiments in FIG. 4, the wireless access point 105-1 examines information received from the communication device 120-1 such as EAP-Identity information sent from the communication device 120-1 during the anonymous EAP-TLS. If the identity information specifies the OSU_NAI (on-line sign up network address information OSU.TWX.COM) that was sent in the configuration information 136-1 (a.k.a., OSU_Provider_List (I.E.,), the wireless access point 105-1 as well as the remote authentication server 150 (sometimes known as a AAA server) treat this association/authentication as an on-line sign up access and carry out the anonymous EAP-TLS authentication with the remote authentication server 150. Otherwise, as further discussed below with respect to FIG. 5, the remote authentication server 150 treats the session as production Passpoint access authentication and carries out the type of the EAP authentication that is defined for the production Passpoint access.

In this example embodiment, because the communication device 120-1 transmits the request to use online sign up services, the remote authentication server 150 marks the device session as an on-line sign up session (as opposed to a production session as discussed below in FIG. 5).

At the end of the anonymous EAP-TLS authentication (during communications 335), via further communications 340, the wireless access point 105-1 supports exchange of appropriate security information such as encryption keys such that the wireless communication link 128-1 between the communication device 120-1 and the wireless access point 105-1 is secured via encryption.

In one embodiment, to support a key exchange, the wireless access point 105-1 performs OSEN (The OSU Server-only authenticated layer 2 Encryption Network) 4-way handshakes with the device instead of using regular RSNE (Robust Security Network Element).

Via further communications 350, the communication device 120-1 attempts to communicate through the wireless access point 105-1 to the server resource 195-1 (assigned network address OSU.TWX.COM) to sign up for use of wireless network services. The gateway resource 160 intercepts the corresponding data traffic to learn of an attempt by the communication device 120-1 to communicate with the server resource 195-1. As its name to just, the gateway resource 160 acts as a gateway and controls a flow of communications between the wireless access points 105 and corresponding network 190-1.

Subsequent to intercepting the communications 350, via communications 370, the gateway resource 160 queries the remote authentication server 150 that previously authenticated the communication device 120-1 using anonymous EAP-TLS and using the communication device 120-1 identity (such as a WiFi™ MAC address assigned to the communication device 120-1). The gateway resource 160 queries the remote authentication server 150 to determine whether the communication device 120-1 should be allowed use of the gateway resource 160 to access a server resource in network 190-1.

In one embodiment, during the query, the remote authentication server 150 returns a specific service name in the Access-Accept reply for the current valid OSU anonymous EAP-TLS authentication associated with the communication device 120-1. The service name is configured in the Internet access gateway to apply a Walled-Garden ACL (Access Control List) to the devices running as OSU sessions; the ACL should only allow the user equipment (mobile communication device) access to a list of on-line sign up resource links such as target on-line sign up resources as specified by OSU URLs as opposed to allowing the communication device 120-1 to access any website because the user 108-1 is not yet a subscriber. In other words, in this instance, the remote authentication server 150 notifies the gateway resource 160 to restrict the communication device 120-1 to communicate with only server resource 195-1 to allow the use 108-1 to sign up for TWX services.

As further shown, via communications 375, in accordance with the temporary authorization received from the remote authentication server 150, the gateway resource 160 enables the communication device 120-1 to communicate through the wireless access point 105-1 and the gateway resource 160 to the server resource 195-1. During subsequent sign-up via communications 375, the service provider operating the server resource 195-1 receives information associated with the user 108-1 and corresponding communication device 120-1 (such as a name of the user 108-1, address of the user, attributes of the corresponding communication device 120-1, the address of the communication device 120-1, etc.).

In one embodiment, during communications 375 of signing up for wireless network services provided by the service provider TWX, the server resource 195-1 forwards association information 410-1 to the communication device 120-1 for storage. The association information 410-1 can include information such as user security association information and/or credentials (authentication credentials, username, password, unique values, etc.) to be used upon a subsequent connection with the wireless access point to authenticate the communication device 120-1 to use wireless network services provided by the service provider TWX. Additionally, the association information 410-1 can include access policy information indicating the type of access to be provided to the corresponding communication device 120-1 upon a subsequent connection using the wireless network identifier TWX-WIFI and resource link TWX.COM.

After the user 108-1 and corresponding communication device 120-1 have completed sign up for use of wireless network services provided by service provider to the TWX via communications with the server resource 195-1 and receiving configuration information 410-1, the communication device 120-1 can be configured to disconnect (terminate the respective on-line sign up session over wireless communication link 128-1) and reconnect with the wireless access point 105-1 using network address information TWX.COM using the wireless network identifier TWX-WIFI. In such an instance, as further discussed below, the reconnect can include using standard Passpoint authentication (such as EAP-TTLS, EAP-TLS, EAP-PEAP, EAP-SIM/AKA, etc.) and RSNE procedures. The remote authentication server 150 that receives the Passpoint EAP authentication will authenticate the user 108-1 and mark the communication device 120-1 as being a standard Passpoint access device instead of an on-line sign up (OSU) access device.

In a similar manner, the respective user 108-1 can sign up and subsequently use wireless network services provided by service provider JAMMIN, RINGER, etc., assuming that the user 108-1 is not yet a subscriber of such services.

Figure 5:
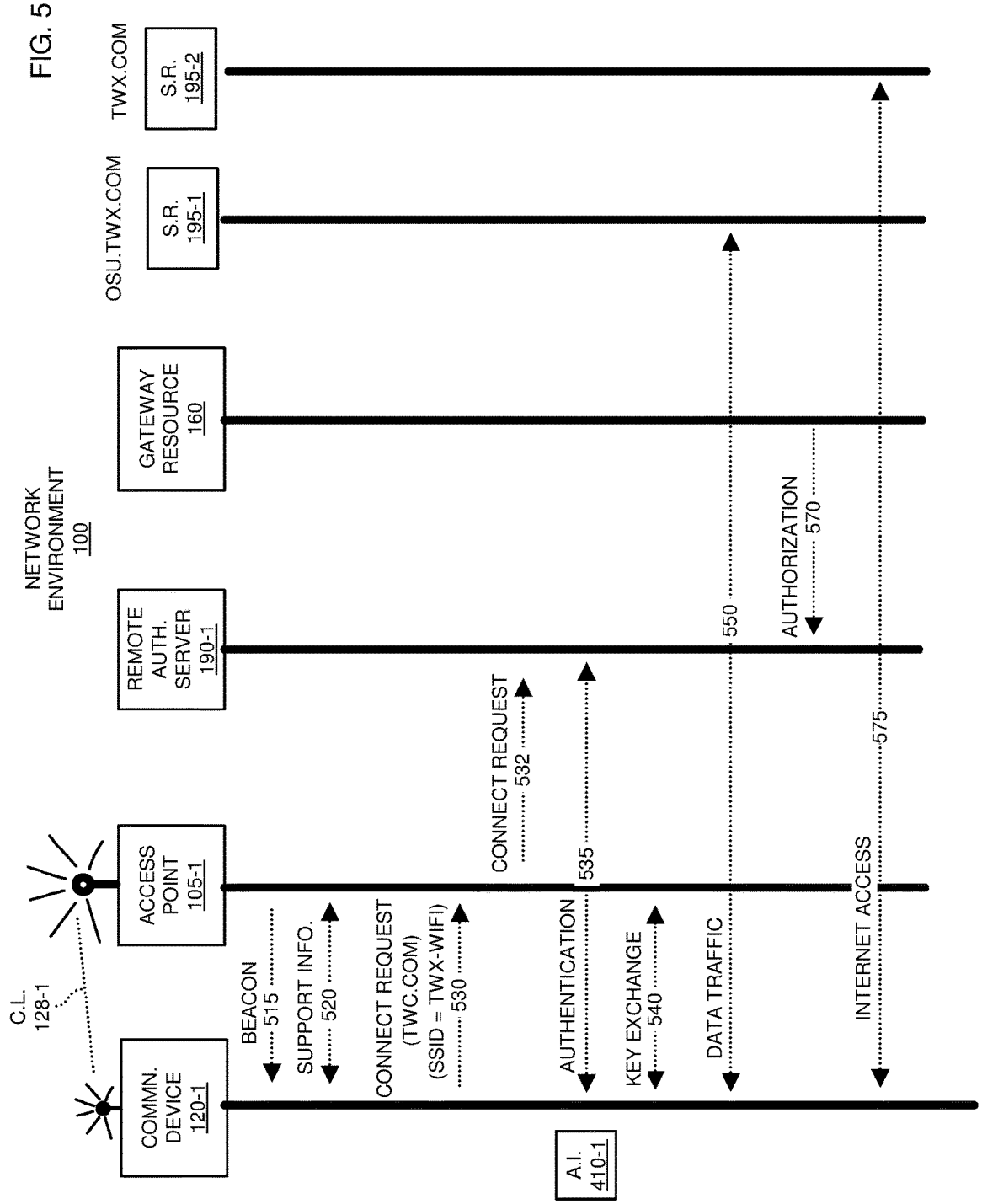
FIG. 5 is an example diagram illustrating use of wireless network services based on a wireless network identifier according to embodiments herein.

FIG. 5 is an example diagram illustrating use of wireless network services based on a wireless network identifier according to embodiments herein.

Subsequent to expanding at least coverage via signing up for use of corresponding wireless network services provided by the service provider TWX, the communication device 120-1 updates the corresponding subscription information 139-1 to indicate that the user 108-1 is a TWX subscriber. Assume that the user 108-1 operates the communication device 120-1 while in a vicinity of the wireless access point 105-1. Via communications 515 such as one or more wireless messages, the wireless access point 105-1 transmits a respective beacon or probe response to the communication device 120-1. As previously discussed, the communications 515 can include information indicating presence and availability of the wireless access point 105-1 in the network environment 100.

In one embodiment, the communications 515 include a notification indicating that the wireless access point 105-1 supports distribution of passpoint information.

Via further communications 520, to learn of supported service providers associated with the wireless access point 105-1, and retrieve corresponding pass point information indicating the one or more service provider supported by the corresponding wireless access point 105-1, the communication device 120-1 transmits a query (such as a pass point information query) to the wireless access point 105-1. In response to receiving the query from the communication device 120-1 requesting service provider support information, the wireless access point 105-1 transmits all or a portion of the configuration information 136 as shown in FIG. 3 to the communication device 120-1.

As previously discussed, transmission of the configuration information 136 to the communication device over the wireless communication link 128-1 notifies the communication device 120-1 of the different service providers supported by the wireless access point 105-1 as well as corresponding information enabling the respective user 108-1 of the communication device 120-1 to execute different functions associated with a respective service provider such as: i) signing up to become a subscriber of corresponding wireless network services provided by the respective service provider, ii) using wireless network services provided by the respective service provider, etc.

Assume that the communication device 120-1 would like to establish a wireless communication link with the wireless access point 105-1. Because the communication user 108-1 is now a subscriber to TWX services as indicated by updated subscription information 139 and based on signup as discussed above, during the association (connection request via communications 530), the communication device 120-1 forwards the selected option (resource link TWX.COM) to the wireless access point 105-1 to notify the wireless access point 105-1 that the user 108-1 would like to use the wireless network services provided by service provider TWX.

Additionally, because the user 108-1 is now a TWX subscriber, via communications 530 the communication device 120-1 conveys an assigned identity of the user 108-1 and/or communication device 120-1 (as retrieved from association information 410-1) to notify the wireless access point 105-1 that the user 108-1 is a pre-existing user.

In response to receiving the connection request via communications 530, the wireless access point 105-1 forwards the connection request and corresponding received information (such as identity of the user and the selected resource link TWX.COM) from the communication device 120-1 to the remote authentication server 150 via communications 532. This notifies the authentication server 190-1 of the identity of the communication device 120-1 and/or user 108-1 as well as the attempt to use the wireless network services provided by the service provider TWX.

After the remote authentication server 150 discovers that communication device 120-1 and user 108-1 do have a subscription to TWX and should be provided wireless network services associated with the service provider TWX, the remote authentication server 150 furthers association with and authentication of the communication device 120-1 using the wireless network identifier TWX-WIFI.

Via yet further communications 535, in accordance with further embodiments, the wireless access point 105-1 examines information received from the communication device 120-1 such as EAP-Identity information sent from the communication device 120-1 during authentication. The remote authentication server 150 treats this requested session as production Passpoint access authentication and carries out the type of the EAP authentication that is defined for the production Passpoint access. In one embodiment, via communications 535, the communication device 120-1 is required to provide appropriate security information to the remote authentication server 150 to prove that the computer device 120-1 should be allowed use of the wireless access point 105-1 and corresponding gateway resource 160.

Subsequent to authentication of the communication device 120-1 based at least in part on use of association information 410-1, via further communications 540, the wireless access point 105-1 supports exchange of encryption keys such that the wireless communication link 128-1 between the communication device 120-1 and the wireless access point 105-1 is secured via encryption.

Via further communications 550, the communication device 120-1 attempts to communicate through the wireless access point 105-1 to the server resource 195-2 (assigned network address TWX.COM) to use corresponding wireless network services. The gateway resource 160 intercepts the corresponding data traffic to learn of an attempt by the communication device 120-1 to communicate with the server resource 195-2.

Subsequent to intercepting the communications 550, via subsequent communications 570 with the remote authentication server 150, the gateway resource 160 queries the remote authentication server 150 to determine whether the communication device 120-1 should be allowed use of the gateway resource 160. In this instance, the remote authentication server 150 notifies the gateway resource 160 to provide the communication device 120-1 access to the server resource 195-2.

After the user 108-1 and corresponding communication device 120-1 have completed authentication, and authorization with server resource 195-2, the communication device 120-1 is able to use wireless network services provided by service provider to the TWX to access any server resources in network 190-1. In one embodiment, the network 190-1 includes the Internet.

Figure 6:
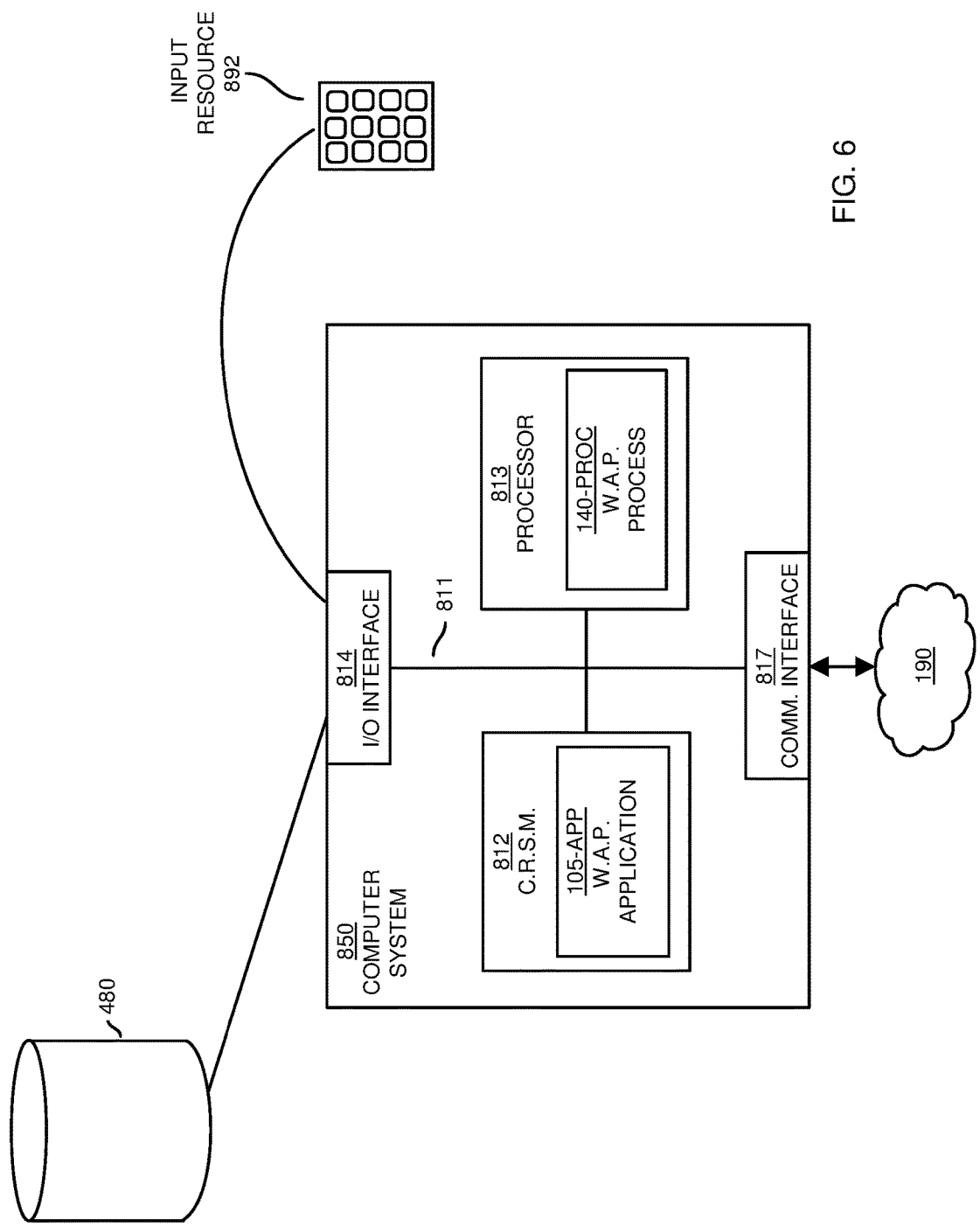
FIG. 6 is an example diagram illustrating a computer system to carry out operations according to embodiments herein.

FIG. 6 is a diagram illustrating an example computer architecture in which to execute any of the functionality according to embodiments herein. Any of the different processing techniques can be implemented via execution of software code on computer processor hardware. Computer system 850 may reside in the communication device 120-1; computer system 850 may reside in a respective wireless access point; computer system may reside in the remote authentication server 150; and so on.

As shown, computer system 850 (e.g., computer processor hardware) of the present example can include an interconnect 811 that couples computer readable storage media 812 such as a non-transitory type of media (i.e., any type of hardware storage medium) in which digital information can be stored and retrieved. The computer system 850 can further include processor 813 (i.e., computer processor hardware such as one or more processor co-located or disparately located processor devices), I/O interface 814, communications interface 817, etc.

Note again that the computer system 850 can be located at any suitable locations in network environment 100 to carry out the operations as discussed herein. For example, computer processor hardware (i.e., processor 813 and/or computer system 850) and/or wireless access point application 140-APP can be located in a single location or can be distributed amongst multiple locations. Wireless access point application 140-APP can be configured to execute the operations as discussed with respect to any of the wireless access points. A similar computer system can be implemented to execute instructions associated with the remote authentication server 150, communication device 120-1, etc.

As its name suggests, I/O interface 814 provides connectivity to resources such as repository 480, input resource 892, one or more display screens, etc.

Computer readable storage medium 812 can be any hardware storage device to store data such as memory, optical storage, hard drive, floppy disk, etc. In one embodiment, the computer readable storage medium 812 stores instructions and/or data associated with management application 140-1.

Communications interface 817 enables the computer system 850 and processor resource 813 to communicate over a resource such as any of networks 890. I/O interface 814 enables processor resource 813 to access data from a local or remote location, control a respective display screen, receive input, etc.

As shown, computer readable storage media 812 can be encoded with wireless access point application 140-APP (e.g., software, firmware, etc.) executed by processor 813. Wireless access point application 140-APP can be configured to include instructions to implement any of the operations as discussed herein associated with the wireless access point 105-1.

During operation of one embodiment, processor 813 accesses computer readable storage media 812 via the use of interconnect 811 in order to launch, run, execute, interpret or otherwise perform the instructions in wireless access point application 140-APP stored on computer readable storage medium 812.

Execution of the wireless access point application 140-APP produces processing functionality such as wireless access point process 140-PROC in processor resource 813. In other words, the wireless access point process 140-PROC associated with processor resource 813 represents one or more aspects of executing wireless access point application 140-APP within or upon the processor resource 813 in the computer system 850.

Those skilled in the art will understand that the computer system 850 can include other processes and/or software and hardware components, such as an operating system that controls allocation and use of hardware resources to execute wireless access point application 140-APP.

In accordance with different embodiments, note that computer system may be any of various types of devices, including, but not limited to, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 850 may reside at any location or multiple locations in network environment 100. The computer system 850 can be included in any suitable resource in network environment 100 to implement any of the functionality as discussed herein.

As previously discussed, note again that each of the other functions as discussed herein can be executed in a respective computer system based on execution of corresponding instructions. For example, communication device can include respective computer readable storage medium and processor hardware to execute the operations performed by communication device 120-1.

Functionality supported by the different resources will now be discussed via flowcharts in FIGS. 7-9. Note that the steps in the flowcharts below can be executed in any suitable order.

Figure 7:
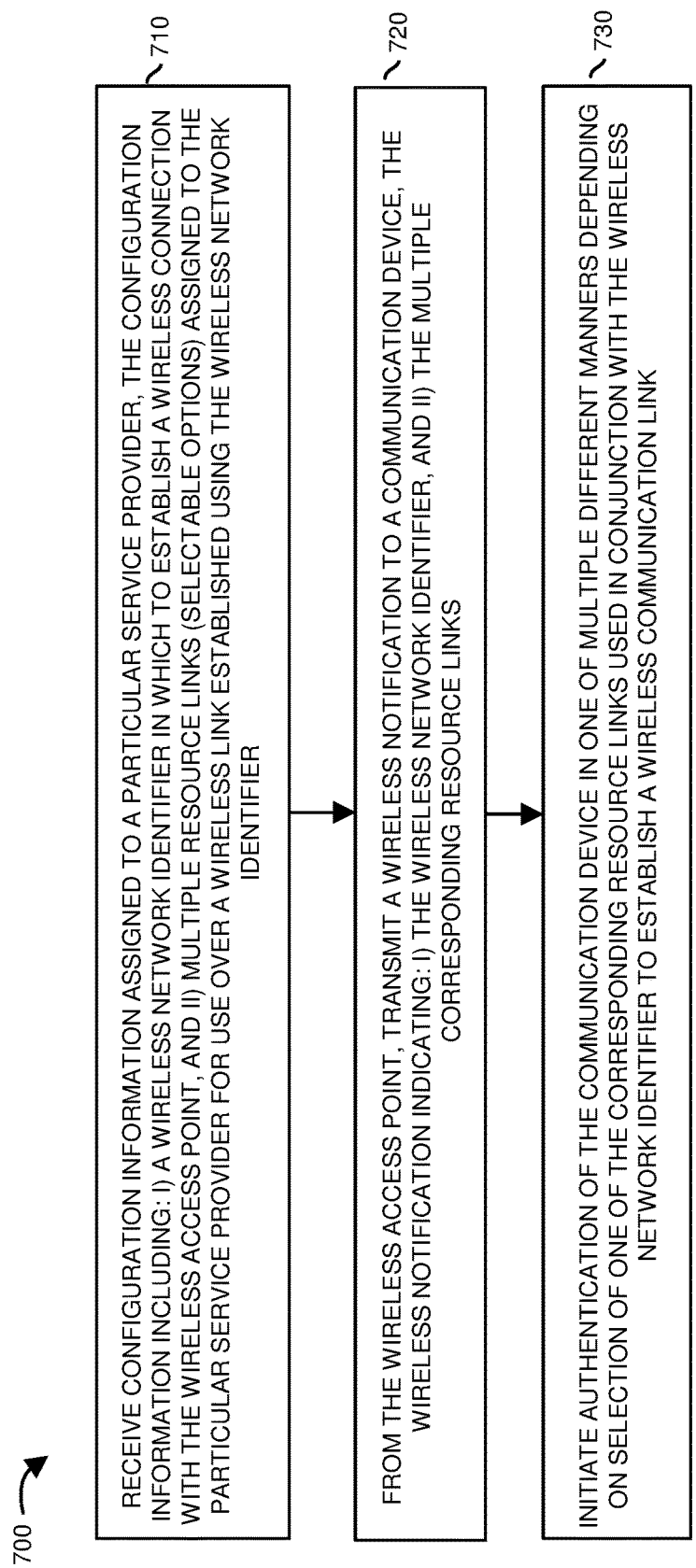
FIGS. 7-9 are example diagrams illustrating methods according to embodiments herein.

FIG. 7 is a flowchart 700 illustrating an example method according to embodiments herein. Note that there will be some overlap with respect to concepts as discussed above.

In processing operation 710, the wireless access point 105-1 (or other suitable resource) receives configuration information 136 assigned to a particular service provider TWX. The configuration information 136 includes: i) a wireless network identifier such as TWX-WIFI in which to establish a wireless connection with the wireless access point 105-1, and ii) multiple resource links (selectable options) such as including OSU.TWX.COM and TWX.COM assigned to the particular service provider TWX.

In processing operation 720, the wireless access point 105-1 transmits a wireless notification such as via communications 320 to communication device 120-1. The wireless notification such as support information includes: i) the wireless network identifier TWX-WIFI, and ii) the multiple corresponding selectable option including resource links OSU.TWX.COM and TWX.COM assigned to the particular service provider TWX.

In processing operation 730, during association, the wireless access point 105-1 initiates authentication of the communication device 120-1 in one of multiple different manners depending on selection of one of the corresponding resource links used in conjunction with the wireless network identifier to establish wireless communication link 128-1.

Figure 8:
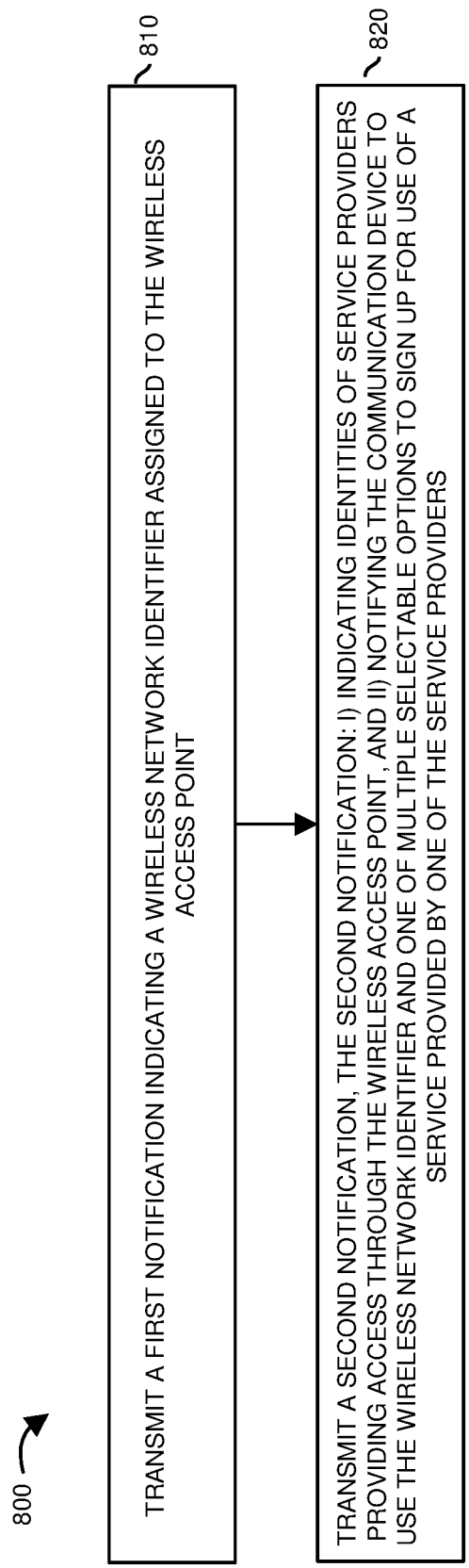

FIG. 8 is a flowchart 800 illustrating an example method according to embodiments herein. Note that there will be some overlap with respect to concepts as discussed above.

In processing operation 810, the wireless access point 105-1 (or other suitable resource) transmits a first notification (such as via communications 520 or communications 620) indicating a wireless network identifier TWX-WIFI assigned to a particular service provider TWX associated with the wireless access point 105-1.

In processing operation 820, the wireless access point 105-1 transmits a second notification such as via communications 520 or communications 620. The second notification: i) indicates wireless network identities of multiple service providers providing access through the wireless access point 105-1, and ii) notifies the communication device 120-1 to use the wireless network identifier TWX-WIFI and one of multiple selectable authentication options (such as OSU.TWX.COM) to sign up for use of wireless network services provided by the particular service provider TWX.

Figure 9:
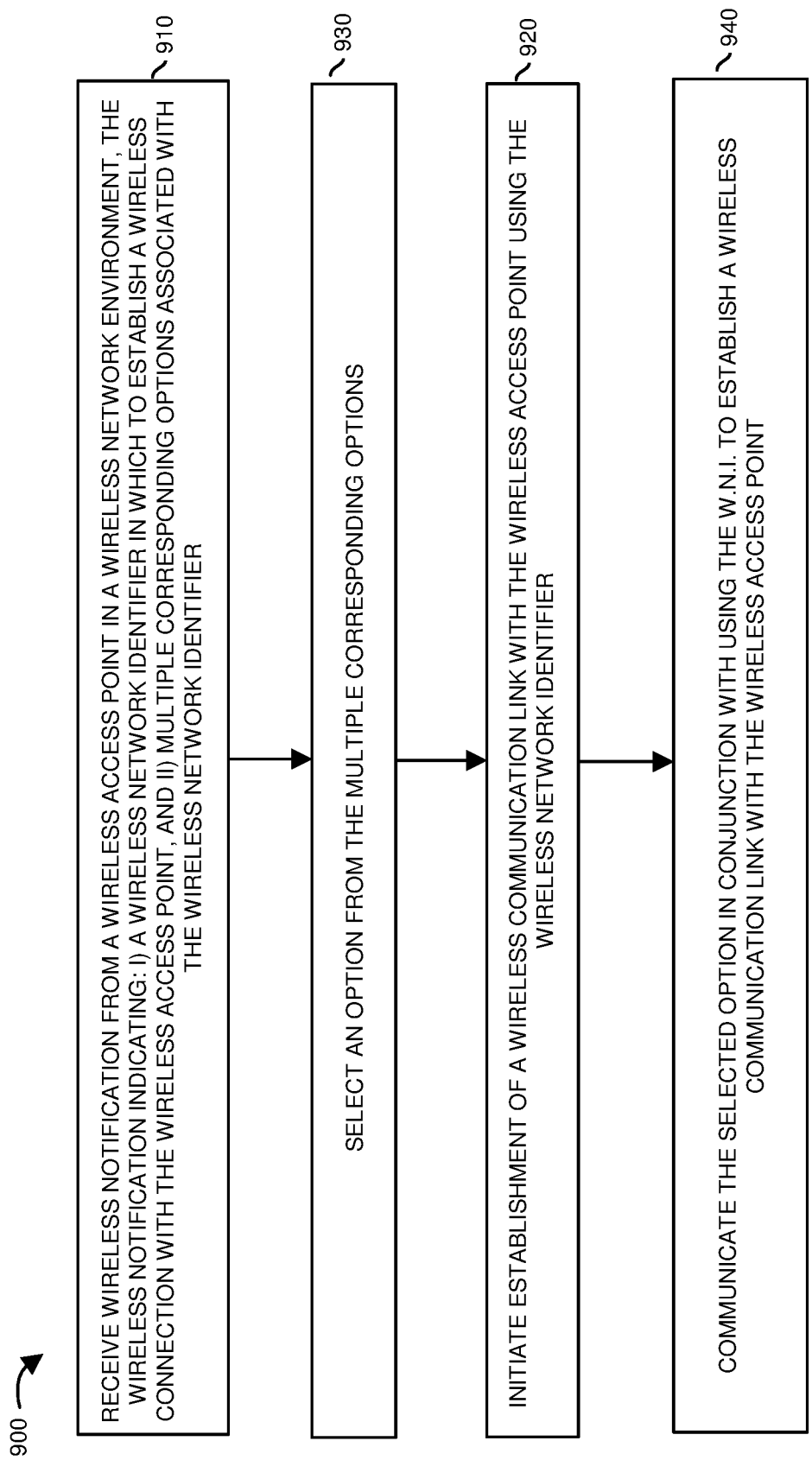

FIG. 9 is a flowchart 900 illustrating an example method according to embodiments herein. Note that there will be some overlap with respect to concepts as discussed above.

In processing operation 910, the communication device 120-1 receives wireless notification such as via communications 520 or communications 620 from wireless access point 105-1. The wireless notification indicates: i) a wireless network identifier TWX-WIFI in which to establish a wireless connection with the wireless access point, and ii) multiple corresponding resource links (such as OSU.TWX.COM and TWX.COM) associated with the wireless network identifier TWX-WIFI.

In processing operation 920, the communication device 120-1 selects a resource link from the multiple corresponding resource links.

In processing operation 930, the communication device 120-1 initiates association and establishment of a wireless communication link 128-1 with the wireless access point 105-1 using the wireless network identifier TWX-WIFI.

In processing operation 940, the communication device 120-1 communicates the selected resource link to the wireless access point 105-1 in conjunction with using the wireless network identifier to establish the wireless communication link 128-1.

Note again that techniques herein are well suited for expanding functionality associated with use of network SSID names assigned to a wireless access point. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    receiving a wireless notification from a wireless access point in a wireless network environment, the wireless notification indicating: i) a wireless network identifier in which to establish a wireless connection with the wireless access point, and ii) multiple corresponding selectable connection options;
    initiating association and establishment of a wireless communication link with the wireless access point using the wireless network identifier; and
    communicating selection of an option amongst the multiple corresponding selectable connection options over the wireless communication link to the wireless access point.

2. The method as in claim 1 further comprising:
    communicating the selection of the option from a communication device to the wireless access point during association of the communication device with the wireless access point.

3. The method as in claim 1, wherein the multiple corresponding selectable connection options are multiple resource links including:
- a first link to a first webpage, the first link selectable to sign up and subscribe to wireless network services provided by a particular service provider through the wireless access point; and
- a second link selectable by existing subscribers of the particular service provider to utilize wireless network services provided by the particular service provider through the wireless access point, the wireless network services including access to a remote network through the wireless access point.

4. The method as in claim 3, wherein selection of the first link in association with a request from a communication device to establish a wireless communication link using the wireless network identifier indicates that a user of the communication device is attempting to communicate with an on-line sign server resource to subscribe to the wireless network services.

5. The method as in claim 3, wherein selection of the second link in association with a request from a communication device to establish a wireless communication link using the wireless network identifier indicates that a user of the communication device is a pre-existing subscriber attempting to use the wireless network services provided by the service provider.

6. The method as in claim 3 further comprising:
- receiving temporary authorization to communicate with a sign-up server resource as specified by the first link; and
- receiving credentials from the sign-up server resource enabling subsequent use of the second link to access a remote network via a wireless communication link established via the wireless network identifier.

7. The method as in claim 1 further comprising:
- transmitting a request from a communication device to the wireless access point, the request establishing the wireless communication link between the communication device and the wireless access point based on the wireless network identifier, the request further indicating the selected option, the selected option indicating that the user of the communication device would like to sign up for use of the wireless network services provided by the particular service provider.

8. The method as in claim 1, wherein the wireless network identifier includes text indicating an identity of a particular service provider.

9. The method as in claim 8, wherein the particular service provider is a first service provider;
- wherein the wireless network identifier is a first wireless network identifier assigned to the first service provider; and
- wherein the wireless network identifier enables a communication device to establish the wireless link with the wireless access point, and: i) register with a second wireless service provider, and ii) subsequent to registering, use subscription services supported by the second service provider using a second wireless network identifier, the second wireless network identifier assigned to the second service provider.

10. The method as in claim 1, wherein a first connection option of the multiple corresponding selectable connection options is a source identifier assigned to a first wireless network service provider providing wireless service through the wireless access point to a remote network; and
wherein a second connection option of the multiple corresponding selectable connection options is a source identifier of an on-line server resource in which to newly sign up for use of wireless network services provided by a second wireless network service provider of multiple wireless network service providers providing service through the wireless access point to the remote network.

11. The method as in claim 1, wherein the wireless access point is a first wireless access point; and
- wherein the selectable connection options include a first connection option and a second connection option in which to communicate through the first wireless access point to a remote network, the first connection option assigned to a first wireless network service provider providing wireless services through the first wireless access point, the second connection option assigned to a second wireless network service provider providing wireless services through the first wireless access point.

12. The method as in claim 11, wherein the second wireless network service provider is a partner with respect to the first wireless network service provider, the second wireless network service provider and the first wireless network service provider sharing use of the first wireless access point.

13. The method as in claim 11, wherein the second wireless network service provider operates a second wireless access point in a vicinity of the first wireless access point.

14. The method as in claim 1, wherein the communicating of the selected option to the wireless access point provides notification that a user of a respective communication device would like to sign up for wireless network services associated with a second wireless network service provider, the second wireless network service provider being a partner with respect to a first wireless network service provider operating the wireless access point.

15. The method as in claim 1 further comprising:
- transmitting the selected option and a communication from a communication device to the wireless access point, the communication indicating that a user of a communication device transmitting the selected option is currently not a subscriber of a wireless network service provider assigned to the selected option.

16. The method as in claim 1, wherein the wireless access point is a first wireless access point operated by a first wireless network service provider in the network environment; and
- wherein the selected option is assigned to a second wireless network service provider operating a second wireless access point in the network environment, the second wireless access point disparately located with respect to the first wireless access point.

17. The method as in claim 16, wherein a region of wireless coverage provided by the second wireless access point overlaps with respect to a region of wireless coverage provided by the first wireless access point.

18. The method as in claim 1, wherein a first wireless network service provider provides wireless network services via the wireless access point; and
- wherein the wireless access point receives notification that a user of a respective communication device would like to sign up for wireless network services associated with a second wireless network service provider, the second wireless network service provider being a partner with respect to the first wireless network service provider.

19. The method as in claim 1 further comprising:
communicating the selected option of the multiple corresponding selectable connection options and a data value from a mobile communication device to the wireless access point, the data value indicating that a corresponding user of the mobile communication device has not yet been authorized to use wireless network services provided by a service provider assigned to the selected option.

20. The method as in claim 1 further comprising:
receiving the wireless notification prior to the association and establishment of the wireless communication link between a mobile communication device and the wireless access point.

21. A method comprising:
via computer processor hardware in a wireless access point operating in a wireless network:
transmitting a first notification indicating a wireless network identifier assigned to a particular service provider associated with the wireless access point; and
transmitting a second notification, the second notification: i) indicating wireless network identities of multiple service providers providing access through the wireless access point, and ii) notifying the communication device to use the wireless network identifier assigned to the wireless access point to sign up for use of a service provided by the particular service provider.

22. The method as in claim 21 further comprising:
receiving a query from a communication device requesting service provider information indicating identities of the multiple service providers that provide access through the wireless access point; and
transmitting the second notification in response to receiving the query.

23. The method as in claim 21, wherein the first notification indicates to the communication device that the wireless access point supports use of the wireless access point by subscribers of the multiple different service providers.

24. A system comprising:
a communication device operable to:
receive a wireless notification from a wireless access point, the wireless notification indicating: i) a wireless network identifier in which to establish a wireless connection with the wireless access point, and ii) multiple corresponding selectable connection options associated with the wireless network identifier;
initiate establishment of a wireless communication link with the wireless access point using the wireless network identifier; and
communicate selection of an option amongst the multiple corresponding selectable connection options to the wireless access point.

25. The system as in claim 24, wherein the communication device is further operable to: communicate the selected option to the wireless access point during association of the communication device with the wireless access point to establish the wireless communication link.

26. The system as in claim 24, wherein the multiple corresponding selectable connection options associated with the wireless network identifier are multiple resource links including:
a first link selectable to subscribe to wireless network services provided by the particular service provider through the wireless access point; and
a second link selectable by existing subscribers of the particular service provider to utilize wireless network services provided by the particular service provider through the wireless access point, the wireless network services including access to a remote network.

27. The system as in claim 26, wherein selection of the first link in association with a request to establish a wireless communication link using the wireless network identifier indicates that a user of the communication device is attempting to communicate with an on-line sign server resource to subscribe to the wireless network services.

28. The system as in claim 26, wherein selection of the second link in association with a request to establish a wireless communication link using the wireless network identifier indicates that a user of the communication device is a pre-existing subscriber attempting to use the wireless network services provided by the service provider.

29. The system as in claim 26, wherein the communication device is further operable to:
receive temporary authorization to communicate with a server resource as specified by the first link; and
receive credentials from the server resource enabling subsequent use of the second link to access a remote network via a wireless communication link established via the wireless network identifier.

30. The system as in claim 24, wherein the communication device is further operable to:
transmit a request to the wireless access point to establish a wireless communication link between the communication device and the wireless access point based on the wireless network identifier, the request including selection of the selected option indicating that the user of the communication device would like to sign up for use of the wireless network services provided by the particular service provider.

31. Computer-readable storage hardware having instructions stored thereon, the instructions, when carried out by computer processor hardware, causing the computer processor hardware to perform operations of:
receiving a wireless notification from a wireless access point in a wireless network environment, the wireless notification indicating: i) a wireless network identifier in which to establish a wireless connection with the wireless access point, and ii) multiple corresponding selectable connection options associated with the wireless network identifier;
initiating association and establishment of a wireless communication link with the wireless access point using the wireless network identifier; and
communicating selection of an option amongst the multiple corresponding selectable connection options to the wireless access point.

* * * * *